June 7, 1960 R. H. EISENGREIN 2,939,368
CONTOUR TRACING APPARATUS
Filed May 12, 1958 5 Sheets-Sheet 1

INVENTOR.
ROBERT H. EISENGREIN.
BY Chas. T. Hawley
ATT'Y.

June 7, 1960   R. H. EISENGREIN   2,939,368
CONTOUR TRACING APPARATUS
Filed May 12, 1958   5 Sheets-Sheet 2

TYPICAL VECTORS

INVENTOR.
ROBERT H. EISENGREIN.
BY Chas. T. Hawley
ATTY.

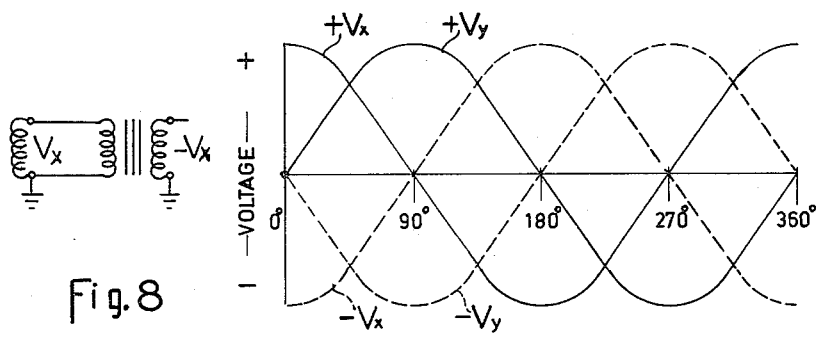
Fig. 8
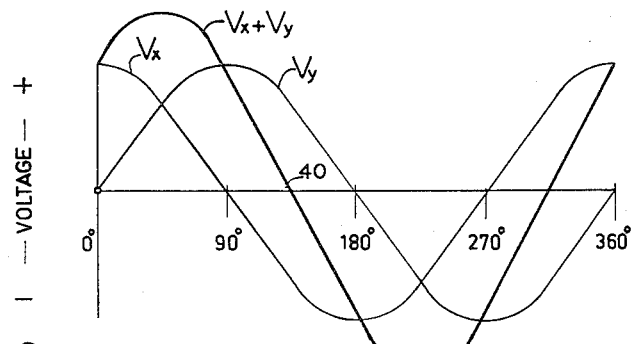
Fig. 9
Fig. 9a
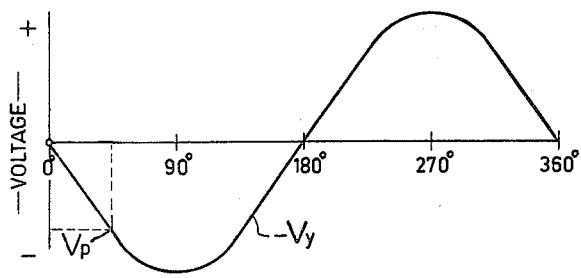
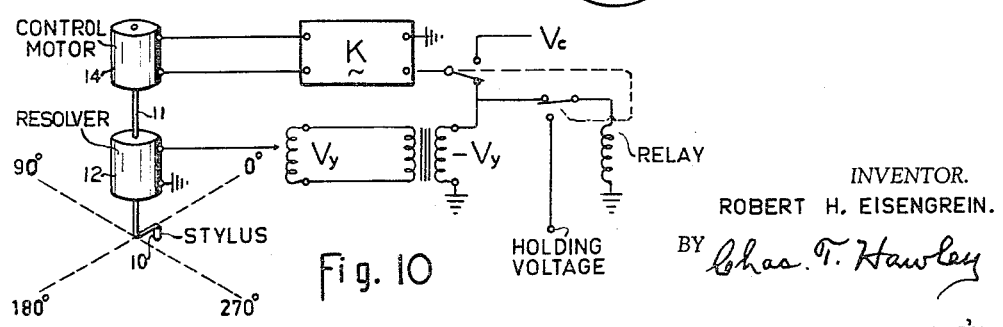
Fig. 10
INVENTOR.
ROBERT H. EISENGREIN.
BY Chas. T. Hawley
ATT'Y.

June 7, 1960   R. H. EISENGREIN   2,939,368
CONTOUR TRACING APPARATUS
Filed May 12, 1958   5 Sheets-Sheet 4
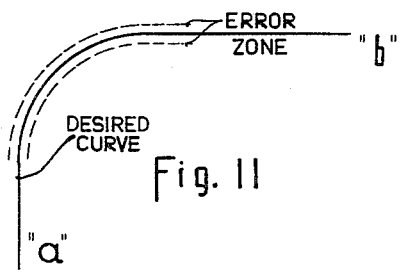
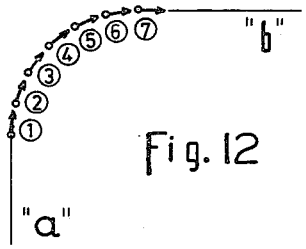
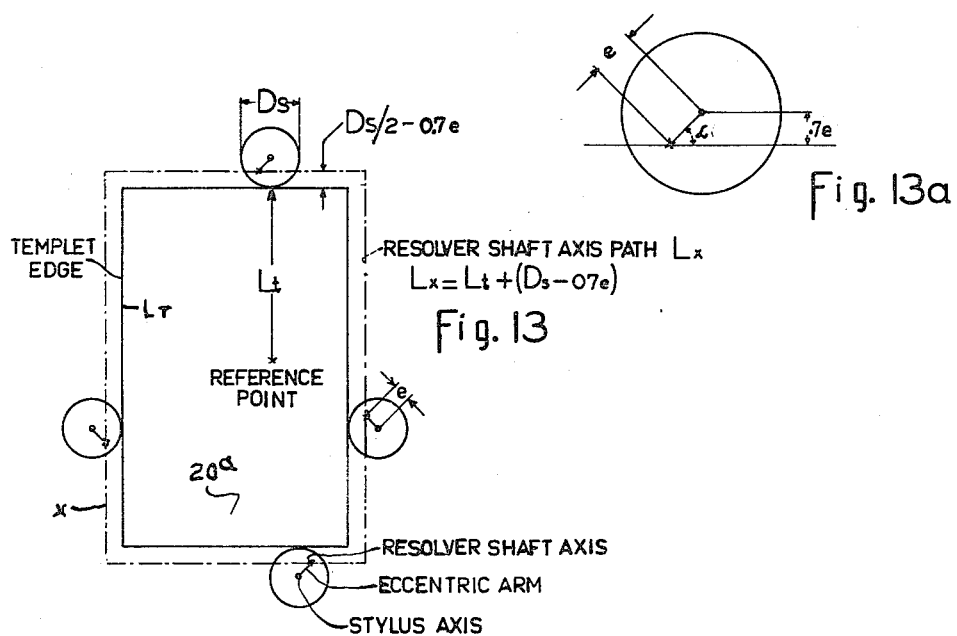
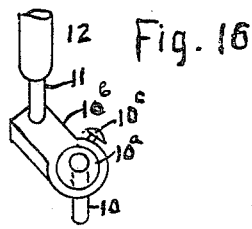
INVENTOR.
ROBERT H. EISENGREIN.
BY Chas. T. Hawley
ATTY.

United States Patent Office 2,939,368
Patented June 7, 1960

2,939,368

CONTOUR TRACING APPARATUS

Robert H. Eisengrein, Skaneateles, N.Y., assignor to Seneca Falls Machine Company, Seneca Falls, N.Y., a corporation of Massachusetts Filed May 12, 1958, Ser. No. 734,513

3 Claims. (Cl. 90—13.5)

This invention relates to apparatus by which a desired pattern contour or profile may be exactly or proportionately reproduced by a cutting or grinding unit under the control of a profile-scanning device and a pair of angularly-disposed but coacting servo-motors.

In the preferred form of the invention, either angular or linear displacement of the scanning device by contact with the pattern activates one or the other or both of the servo-motors and causes them to change the position of the cutting or grinding unit relative to a workpiece which is to be machined to the desired contour.

To the attainment of this general object, an improved scanning device is provided which will selectively activate the servo motors in accordance with changes in its orientation which are caused by changes in the engaged contour of the pattern.

In the preferred construction, the servo-motors operate along perpendicular axes and move proportionately to the coordinates of the scanning device in any given position.

In the modified construction, the servo-motors are controlled from a tape or other similar record which presents the desired contour in suitably coded form.

The invention further relates to arrangements and combinations of parts, which will be hereinafter described and more particularly set forth in the appended claims.

A preferred form of the invention is shown in the drawings, in which

Figure 7:
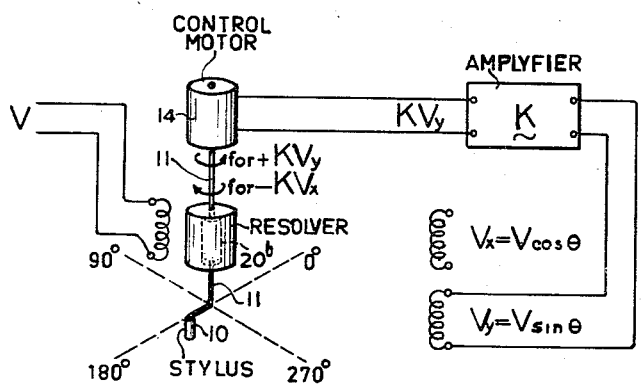
Figure 14:
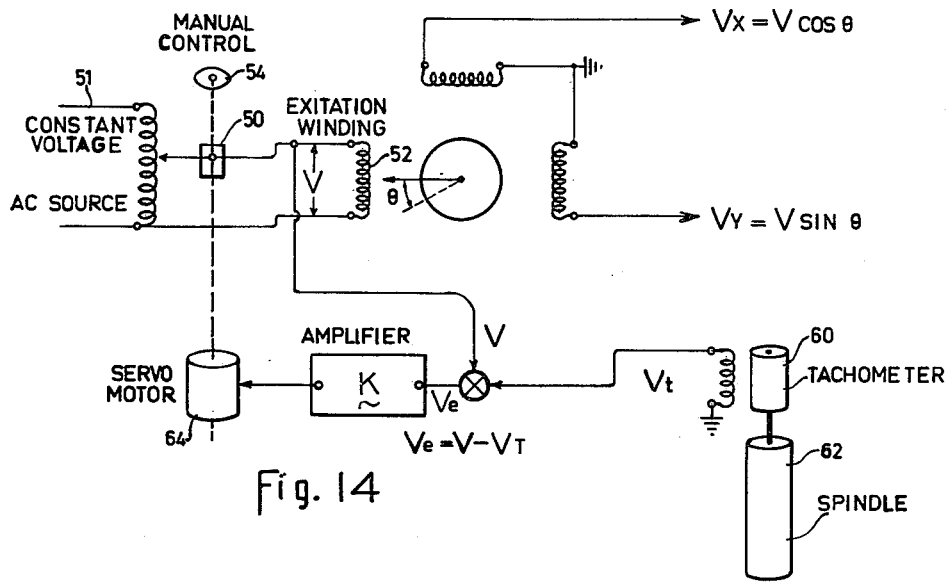
Figure 15:
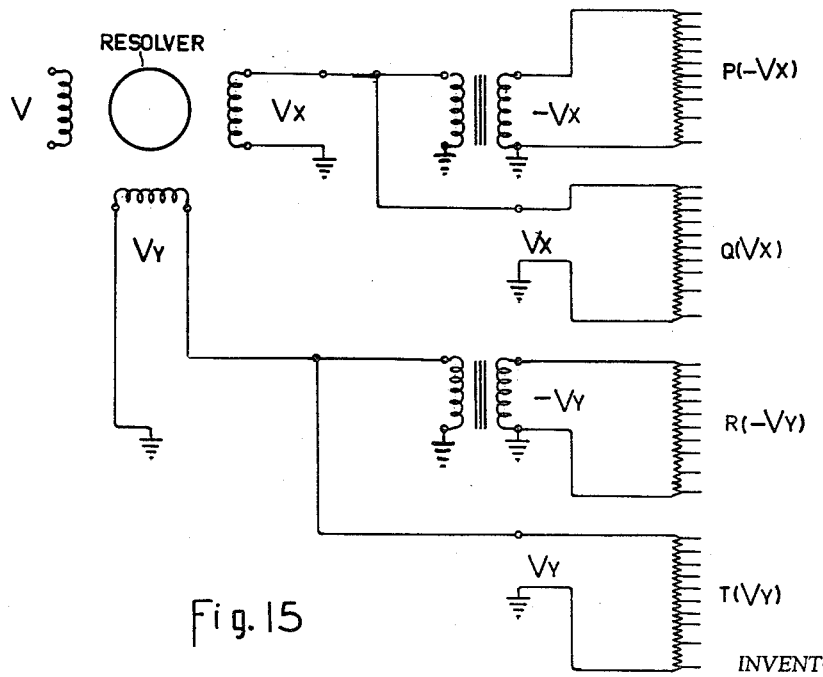

Figs. 6a to 6e indicate directions of tool movement responsive to different voltage vectors;

Fig. 7 is a diagram illustrating electric or tape control;

Fig. 8 is a diagram showing superposed voltage curves;

Fig. 9 is a diagram showing certain combined voltage curves;

Fig. 9a is a diagram of an additional voltage curve;

Fig. 10 is a diagram of a control loop to be described;

Fig. 11 is a diagram of the desired movement of a tool when turning a corner;

Fig. 12 is a similar view to be described;

Fig. 13 is a diagram showing stylus reactions to a simple template;

Fig. 13a is an enlarged diagram of certain parts in Fig. 13;

Fig. 14 is a diagram of a control loop involving variable spindle speeds;

Fig. 15 is a diagram showing use of a network of resistors; and

Fig. 16 is a perspective view of a stylus adjusting device.

Figure 1:
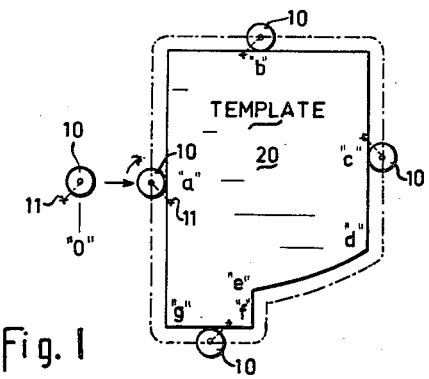
Fig. 1 is a plan view of a pattern or contour template to be reproduced.

The apparatus to be described automatically traces the progressive changes in a desired 360° contour, such as that shown in the template of Fig. 1. The apparatus will produce this contour by tracing a mechanical template which presents the contour, or from coded information supplied by a punched tape or card.

The tracing apparatus to be first described uses a mechanical template as a reference, and a cutting tool is associated with the tracing apparatus and will reproduce the desired contour in any suitable workpiece.

Figure 2:
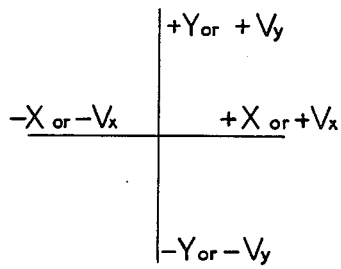
Fig. 2 is an axis movement diagram to be described.

To trace the contour, a stylus 10 (Fig. 1) is attached eccentrically to the shaft 11 of a rotary sensing device or resolver 12. The resolver can be moved independently along both the X and Y directions, as shown by the set of coordinate X and Y axes (Fig. 2).

As a result of the stylus movement causing rotation of the resolver shaft, the sensing device or resolver 12 supplies electrical information to the X and Y servo-drives. The resulting X and Y axis movements make the stylus always maintain continuous contact with the template and move in a direction tangent to the template edge at the point of contact.

For example, assume the stylus 10 is initially in the position "0" (Fig. 1) and away from the template 20. By holding the stylus in the correct position, it will cause the X and Y servo-drives to move the stylus toward the template. Initially only X axis motion is needed. Upon contacting the template 20, the reaction torque of the template on the stylus 10 will oppose a stylus bias torque of the control motor 14 (Fig. 10), and the stylus will be forced to partially rotate, thus changing the X and Y orders to be given to the servo-drives. The stylus will continue to move angularly until the X motion is zero and the Y motion becomes maximum. At this point, the stylus motion will be tangent to the template at point "a."

As the contour continues to change, the stylus bias torque will cause or permit the stylus to be shifted angularly by the template reaction torque. This displacement will cause appropriate changes in the X and Y velocities until the resulting velocity produces a stylus movement tangent to the contour at the new point of stylus contact.

Progressive angular positions of the stylus with respect to the template are shown at position "b" and "c" in Fig. 1.

General construction

Figure 3:
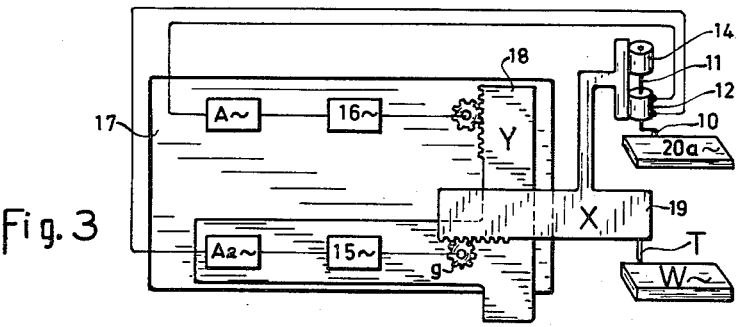
Fig. 3 is a diagrammatic view of certain assembled tracing apparatus.

The general construction is shown diagrammatically in Fig. 3. A resolver 12 has a stylus 10 eccentrically attached to one end of its shaft 11, and a control motor 14 is attached to the other end of the shaft 11. These parts are all mounted on an X axis slide 19.

The shaft 11 of the resolver 12 is turned to various positions by coaction of the control motor or stylus bias torque and any template reaction torque caused by the pressure of the template 20 against the stylus 10. As the resolver shaft 11 is turned by the stylus, the resolver furnishes electrical signals for the X and Y servo-drives 15 and 16. Since the resolver 12 is mounted on the X axis slide 19, mechanical feedback from the X axis slide 19 to the stylus causes continuous movement of the X and Y servo-drives until the entire apparatus is traveling in a path tangent to the contour of the template at the point of stylus contact.

A base or table 17 (Fig. 3) supports a Y axis slide 18, a servo-drive 16 and an amplifier A. An X axis slide 19, a servo-drive 15 and an amplifier A2 are mounted on top of the Y axis slide. Anything mounted on the Y axis slide 19 can thus be moved to any point in a single plane by the independent motions of the X and Y servo-drives 15 and 16. The amplifiers A and A2 provide increased power for the servo-drives.

Any suitable tool T may be mounted on the X slide 19. The template 20a is mounted on a fixed support in such manner that the stylus 10 can contact all edges of the template.

Any usual limit switch (not shown) may be provided for stopping the machine on completion of a profiling operation, and the machine may then be returned either manually or automatically to initial condition.

*Component details*

Figure 4:
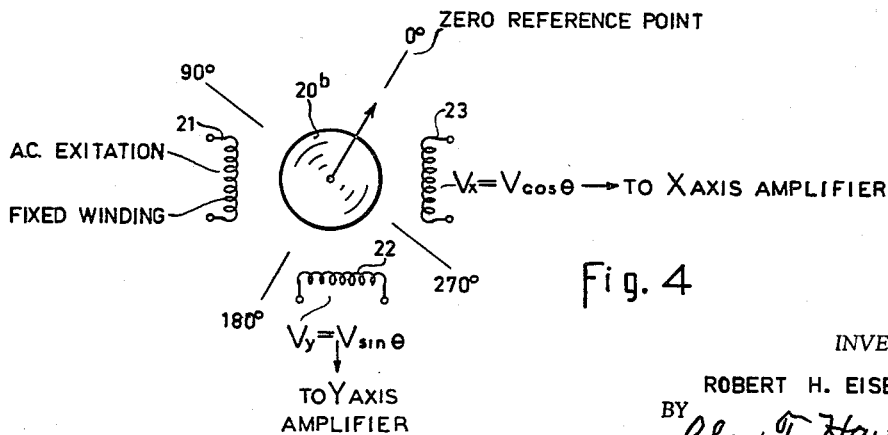
Fig. 4 is an exploded view of the several parts of a resolver.

The electrical details of the resolver 12 are shown in Fig. 4. The resolver has a rotor 20b which is given a continuous bias, as a fixed winding 21 of the resolver is excited with an A.C. voltage V.

The resolver 12 has two output windings 22 and 23 arranged so that one winding 23 furnishes a signal $V_x$, where $V_x = V \cos \theta$. $\theta$ is the angle of the resolver rotor 20b with respect to a zero reference point on the non-rotating casing of the resolver.

Figure 5:
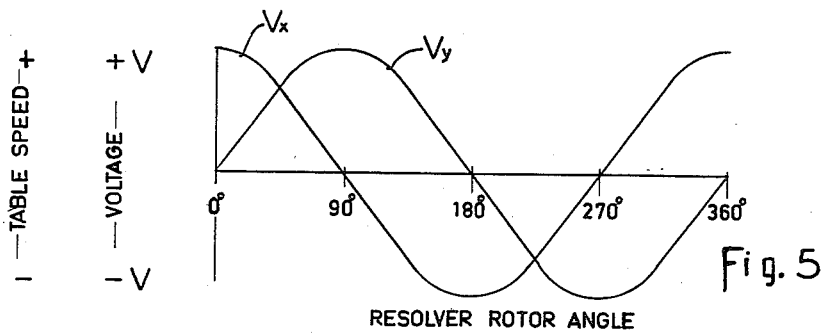
Fig. 5 is a diagram showing voltage reactions to various angular displacements of the resolver.

Fig. 5 shows how $V_x$ and $V_y$ will vary as the resolver may be turned from the zero reference point to various angular positions up to a full 360°, and this cycle may in fact be thereafter repeated.

With the arrow on the resolver rotor 20b at the zero reference point, (as shown in Fig. 4) $\theta$ equals zero. Therefore, $V_y = V \sin 0° = 0$ and $V_x = V \cos 0° = V$. As the angle $\theta$ increases towards 90°, $V_y$ increases and $V_x$ decreases until at 90°, $V_y = V$ and $V_x = 0$. As the angle $\theta$ increases further, $V_x$ and $V_y$ vary as shown in the curves. When $\theta = 180°$, $V_x = V \cos 180° = -V$. At this point, the minus sign signifies that the voltage amplitude is the same as it was when $\theta = 0$; but its phase is 180° from the original value. It is this phase reversal which makes the 180° point different from the 0° point.

If these electrical voltages are used to control table servo-drives which provide an output speed directly proportional to the electrical signal and a direction of rotation directly proportional to the phase of the signal (that is, clockwise rotation for plus V and counter-clockwise rotation for −V voltages), the vertical scale of Fig. 5 can be converted to show table velocity directly.

Any suitable servo-drives may be used, such for instance as are shown in Small Patents Nos. 2,585,507 and 2,562,585.

Figure 6:
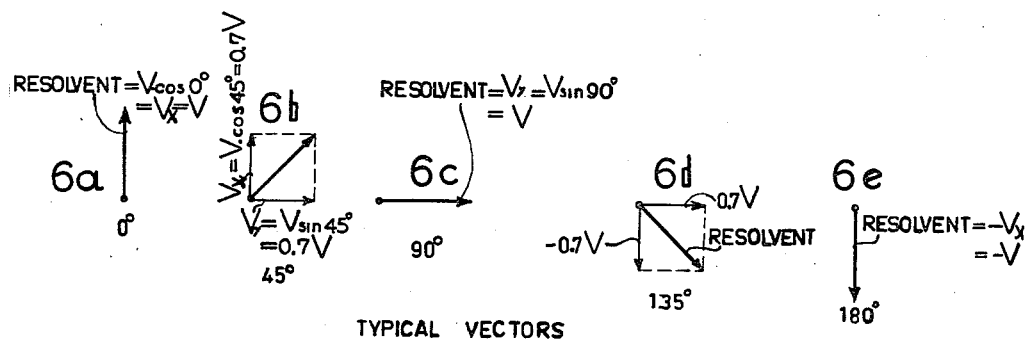

By combining the X and Y velocities for various resolver rotor positions, as shown in Fig. 6, it appears that the resulting velocity VR has a magnitude which remains constant but a direction which varies directly with the resolver rotor angle $\theta$.

This result can be shown mathematically by the equation below. The magnitude of the velocity vector VR is the square root of the sum of the squares of $V_x$ and $V_y$. The angle of the velocity VR equals the arc tangent of $V_y$ and $V_x$. These two items in equation form may be shown as follows:

Magnitude of velocity VR $$= \sqrt{V_x^2 + V_y^2} = \sqrt{V(\cos \theta)^2 + V(\sin \theta)^2}$$
$$= V\sqrt{(\cos \theta)^2 + (\sin \theta)^2} = V$$

Angle of velocity VR $$= \mathrm{Tan}^{-1}\left[\frac{V_y}{V_x}\right] = \mathrm{Tan}^{-1}\left[\frac{V \sin \theta}{V \cos \theta}\right] = \mathrm{Tan}^{-1}[\mathrm{Tan}\,\theta] = \theta$$

If for each point on the template contour, the resolver rotor 20b were turned by an angle equal to the angle of the tangent at that point, the resolver would produce the electrical signals to control the table drives mentioned above. These signals would then produce a resulting velocity vector which at all times would have constant magnitude and also a direction equal to the tangent of the contour at the point of stylus contact.

*Mechanical actuation of the resolver*

Means to actuate the resolver rotor mechanically is shown in Fig. 3. One end of the resolver rotor shaft 11 is connected to a control motor 14. The other end of the rotor shaft has attached to it a stylus 10 which is eccentrically offset from the rotor shaft axis. Fig. 1 shows a typical template 20 and the various positions of the stylus and rotor axes needed to provide the velocity vector VR, so that the template edge will be traced.

With the stylus initially away from the template at point "0," the control motor torque locks the resolver rotor 20b at the zero reference point. Fig. 5 shows that the system then provides maximum X velocity and zero Y velocity and that the stylus will be moved toward the template 20.

When the stylus first contacts the template, the resolver shaft 11 begins to rotate, because the eccentricity of the stylus produces a reaction torque on this shaft. This reaction torque causes partial rotation of the resolver shaft and the change in the angle $\theta$ from zero towards 90° eventually causes $V_x$ to become zero, and $V_y$ to become a maximum.

Simultaneously, the slide velocities become zero in the X direction, and maximum in the Y direction. This is shown by the position of the stylus and the eccentricity at the point "a" in Fig. 1.

As the template reaction force increases as a result of this initial movement against the template and as the resolver rotor is thus forced to turn, the apparatus senses this rotation. At a predetermined angle of turn from this zero reference, the apparatus automatically switches a new voltage to the control motor 14, so that instead of locking the resolver rotor in the zero reference position, it now produces a constant bias torque, as shown at position "a" of Fig. 1 and maintains this position until the template curvature changes, as shown at the first corner of the template. The bias torque then forces the resolver shaft 11 to turn clockwise to the position shown at "b." In actual practice, this change is gradual and continuous. The changes in the angle $\theta$ affect both $V_x$ and $V_y$, so that the resulting velocities are always correct and insure accurate tracing of the template.

The dotted line around the template shows the actual path to be followed by the stylus axis. The eccentricity is shown in exaggerated form and the resolver and stylus axes are only slightly displaced in practice.

As the apparatus continues to trace the template 20, the bias torque will again force the resolver to turn at the next corner until $\theta = 270°$. This angle causes $V_y$ to equal $V \sin 270° = -V$, and $V_x$ to equal $V \cos 270° = 0$. This reverses the Y axis slide drive from the direction shown at "a."

At the next corner "d," the contour changes gradually and the bias torque forces the stylus 10 and the resolver shaft 11 to turn gradually. The angle $\theta$ is varied from 270° at the corner toward 180°. The X and Y axes slide velocities also change gradually between points "d" and "e" on the template.

At the point "e," an abrupt change in contour causes the template to exert a torque opposing the bias torque, and the resolver shaft is thus forced back toward the 270° position. At the point "f," the bias torque forces the resolver to return to the 180° position. This results in $V_y$ becoming 0, and $V_x$ becoming of maximum negative value.

The apparatus next follows the template from "f" to "g," and from "g" to the starting point "a." The apparatus will continue tracing this template contour until the stylus is retracted from the template.

*Electrical or tape control of the resolver*

In addition to controlling the resolver by tracing the mechanical template, the control may be electrical, and the position of the resolver shaft may be determined by control motor torque alone. This mode of control performs two functions. First, it permits locking the resolver at such an angle that the resulting $V_x$ and $V_y$ signals will cause the servo-drives to move the tool to approach the work from a fixed direction. Secondly, it permits the resolver angle to be thereafter set at unique angles independent of a mechanical template.

The way in which the control motor positions the resolver rotor is best explained by referring to Fig. 5. For a resolver rotor angle position of 180°, the voltage $V_y$ is zero. If the rotor is turned towards 270°, $V_y$ increases in the negative direction; but if the rotor angle decreases towards 90°, $V_y$ increases in a positive direction. By sensing the amount of this minus or plus shift of $V_y$ from zero, and also by sensing the phase change (positive or negative), it is possible to tell how far and in which direction the control rotor has turned.

By amplifying this voltage and feeding it to a control motor attached to the resolver shaft, the motor can be made to turn the resolver rotor in a direction which will always reduce $V_y$ to zero. Thus, it would lock the rotor at the 180° position, and if the rotor is forcibly turned from this position, $V_y$ will increase in a direction which would amplify the voltage on the control motor and would cause it to act to resist this change.

This electrical system of operation is shown diagrammatically in Fig. 7. As $V_y$ becomes positive because the resolver rotor angle $\theta$ decreases towards 90°, the amplified value of $V_y$ (namely, $KV_y$) causes the resulting control motor torque to return the rotor to the 180° position. At this point, $V_y$ becomes zero and the control motor torque likewise is zero. For further movement of the rotor towards 270°, the voltage and torque are both reversed.

It is important to note that $V_y$ is also zero at the rotor position of 0°. However, this is an unstable operating position, since the slope of voltage versus rotor angle is reversed from that found at the 180° point.

For example, if the rotor is at a point just off 0°, as at the 10° position, the voltage $V_y$ is positive, and a positive voltage will cause the control motor to increase the resolver angle. Therefore, the rotor will move from the 10° point towards larger values. This further increases $V_y$ and causes the resolver rotation to continue until the apparatus finally stops at the 180° point.

If the voltage $V_x$ is fed into the electronic amplifier K instead of $V_y$, the control motor will be forced to rotate the resolver until a new position is reached, at which point $V_x$ will equal 0. This will occur at a resolver angle of either 90° or 270°. But only at the 90° point is the slope of voltage versus resolver angle suitable for stable operation. Therefore, the rotor should remain locked at the 90° position, and should resist movement from this position by control motor torque.

Fig. 8 shows how additional locking angles may be obtained by taking the voltages $V_x$ and $V_y$ and reversing their phase through a transformer. The resulting curves are as shown.

It is thus apparent that the criteria for locking the resolver rotor at different angles is to develop a voltage in the electronic amplifier which is zero at some unique rotor angle. This voltage must also increase in the positive direction as the rotor angle is decreased, as from 90° towards 0°. The voltage must also increase negatively as the resolver angle is increased, as from 0° to 90°.

With $-V_x$ and $-V_y$ available in Fig. 8, conditions exist for providing rotor angles of 270° and 0° respectively. By feeding $-V_x$ into the electronic amplifier (Fig. 7), the control motor will lock the resolver rotor at 270°. By switching in $-V_y$, the control motor will lock the resolver rotor at 0°. There are thus four unique positions in which the resolver rotor can be locked, namely 0°, 90°, 180° and 270°. These locking angles are achieved by switching the voltages $-V_y$, $V_x$, $V_y$ and $-V_x$ respectively into the electronic amplifier K.

*Additional resolver locking angles*

To lock the resolver rotor at angles other than those mentioned above, it is only necessary to feed a voltage to the electronic amplifier which meets the above-mentioned criterion of being zero and which also has the correct voltage slope with respect to the rotor angle.

On inspection of the curves of Fig. 8, it appears that adding the voltage $V_x$ and $V_y$ will develop a resulting voltage curve 40 which varies with the resolver angle, as shown in Fig. 9. This curve meets the defined criterion only at a rotor angle of 135°. By feeding this sum of $V_x$ and $V_y$ into the electronic amplifier K, the control motor will lock the rotor at 135°.

Several unique combinations are attainable by mixing $V_x$, $V_y$, $-V_x$ and $-V_y$ as shown in the table below:

| Add: | Locking angle, degrees |
|---|---|
| $V_x$ and $-V_y$ | 45 |
| $V_x$ and $V_y$ | 135 |
| $-V_x$ and $V_y$ | 225 |
| $-V_x$ and $-V_y$ | 315 |

A further refinement of locking angle is achieved by combining percentages of $V_x$ and $V_y$. In Fig. 9, each point of the curve $V_x+V_y$, is achieved by adding the individual $V_x$ and $V_y$ vectors. At 135°, $V_x$ and $V_y$ are defined by the equations below:

$$V_y = V \sin 135° = 0.707 V$$
$$V_x = V \cos 135° = -0.707 V$$
$$V_x + V_y = 0$$

Now, if a percentage of the magnitude of $V_x$, as $PV_x$ is used, the equation of $PV_x + V_y$ for a particular angle "A" will require an answer equal to zero. This is shown in the equations below:

$$PV_x + V_y = PV \cos A + V \sin A = 0$$
$$V(P \cos A + \sin A) = 0$$

dividing both sides of the equation by $V \cos A$ we have—

$$P + \frac{\sin A}{\cos A} = 0$$

$$\text{Tan } A = -P$$

$$A = \text{arc Tan } (-P)$$

The final equation shows that the angle "A" at which $PV_x + V_y$ equals zero depends on the percentage (P) of $V_x$ which is used. As P varies from 0% to 100%, "A" varies from 180° to 135°.

Using a selected percentage Q of $V_y$, namely, $QV_y$, and writing the same equations as above, the following results are obtainable:

$$V_x + QV_y = V \cos A + QV \sin A = 0$$

or $$\text{Tan } A = -\frac{1}{Q}$$

Now as Q varies from 0 to 100%, A will vary from 90° to 135°.

Other combinations of $V_x$, $V_y$, $-V_x$ and $-V_y$, plus varying percentages of each, provide a locking position for any angle in the full 360°. Thus, by switching into the electronic amplifier the correct magnitude and amount of the various $V_x$ and $V_y$ combinations, the control motor can be made to lock the resolver rotor at any unique angle in 360°.

*Electrical approach and mechanical actuation*

To provide a mechanical apparatus with the ability to approach the template from a selected angle, the resolver rotor will be locked at such selected angle, as previously discussed. The resulting $V_x$ and $V_y$ signals, when fed to the slide servo-drives, will cause the stylus to move towards the template at this selected angle.

Assuming that $-V_y$ is being fed to the resolver control motor, this will cause the resolver to be locked at 0°. Referring to Fig. 1, this would represent the stylus as at the point "0." When $V_x$ and $V_y$ are now fed to the slide servo-drives, the only motion resulting would be X motion, since $V_x = V$, and $V_y = 0$.

When the stylus is finally forced against the template at point "a," the template reaction force will cause the stylus to be turned toward 90° by virtue of its eccentricity. The voltage $-V_y$ will now be forced to increase in the negative direction. The control motor torque will resist the template reaction torque, but since the servo-drives exert a more powerful force than the resolver control motor, the resolver rotor will be turned. When this voltage $-V_y$ reaches a predetermined level $V_p$ as at 45° from the zero point (Fig. 9a), the voltage $V_p$ will operate a relay, and the relay contacts will switch the electronic amplifier which is feeding the control motor from the $-V_y$ signal to a constant voltage $V_c$. This constant voltage will provide the constant bias torque from the control motor which is needed when tracing a mechanical template. Operations will now proceed as previously discussed under "Mechanical Actuation of Resolver."

Automatic tracing without mechanical template

In order to automatically trace a particular contour without a mechanical template, each point on the contour which presents a unique angle must be defined. It is also know that for each unique resolver angle the combination of $V_x$ and $V_y$, when fed to the servo-drives, will cause all points on the X axis slide to move at this unique angle. As previously explained, the control motor can lock the resolver rotor at any unique angle by switching in resolver control motor voltages of correct magnitude and phase.

Referring to the contour shown in Fig. 1, the path to be followed at point "a" is defined by an angle of 90°. If $V_x$ is fed to the resolver control motor, the resolver rotor will be locked at 90°; thus, $V_x$ will equal 0 and $V_y$ will equal V. Only Y motion will be generated and the contour along "a" will be reproduced.

Sensing and measuring either distance or time to be traveled in this Y direction will determine how long to utilize this $V_y$ signal. A measurement of time in this case is satisfactory, since the vector velocity R previously defined is always a constant.

When the travel along the point "a" contour has reached the corner, the resolver control motor will be energized by $-V_y$. The resolver rotor will now be locked at an angle of 0° and Y axis motion will cease but X axis motion will be generated to produce the contour represented by point "b." The indicated measurement of distance or time will again determine when the next contour change will be reached. At this point $-V_x$ will excite the resolver control motor and lock the resolver rotor at 270°. A further indication of required distance or time will again determine the length of contour travel.

At each of the corners, of course, the voltage to the resolver control motor must be shifted gradually to generate the dotted outer curve shown in Fig. 11. By following the dotted curve, the cutting tool will cut a square corner.

The rate at which new voltages must be fed to the control motor will depend on the accuracy with which the final curve must be generated, and also upon the rate at which the curve must be generated. Fig. 11 represents an expanded portion of a corner contour and illustrates the desired curve, plus an error zone which defines the limits of error which can be tolerated.

By selecting a number of points in the desired curve, which member is determined by the error limits, a unique angle of travel can be determined for each selected point. The final rate at which the curve must be generated will determine the length of time each of these unique angles of travel must be maintained. By feeding the correct A.C. resolver voltage to uniquely define each angle represented by the points 1, 2, 3, 4, 5, etc. (Fig. 12), the resolver rotor angle and the angle of slide travel will be defined. The distance traveled at each point can be controlled by varying the length of time each A.C. signal is fed to the resolver control motor. The spacing of these time signals could be determined by an electronic pulse generator, or by a synchronous motor with a cam and switch which would produce pulses at definite intervals.

The voltage for the resolver control motor always comes from the resolver windings producing $V_x$ and $V_y$. By feeding $V_x$, $V_y$, $-V_x$, and $-V_y$ into a network of resistors such as shown in Fig. 15, there would always be available all unique voltages needed to generate any angle.

Assume that it is desired to resolve a 360° contour into 1° intervals, then 360 separate A.C. voltages would be needed.

By using a punched tape with enough coded holes to feed any selected voltage of the 360 available A.C. voltages to the resolver control motor, the tool would be made to travel in a direction determined by any of these unique angles.

Referring again to Fig. 12, the tool will operate at the angle defined by point 1 for a time determined by the pulse generator. When a new pulse is generated, the punched tape would be rapidly advanced by its tape drive mechanism. The new position would represent the correct combinations of coded holes which would switch a new A.C. voltage to the control motor so that the angle of point 2 would be generated. This motion would continue until the next pulse was generated; the tape would again advance and furnish a new A.C. voltage which represents point 3. This process would be repeated for the entire contour.

By thus representing each unique point of a contour by an A.C. voltage and causing the coded punched tape to feed this voltage to the resolver control motor for a time determined by the path length and error limitations, the apparatus can be made to generate any contour, independently of any mechanical template.

Eccentricity adjustment

Another added feature of this system is its ability to correct for variations in cutter tool diameter. This is important, since variations in tool diameter will cause variations in the dimensions of a piece being machined. This feature is shown in Fig. 13, which represents a simple rectangular template 20a. To trace this template, the stylus center and the resolver shaft axis must be in the various positions shown. The dotted line around the template indicates the path described by the resolver axis and is marked "x." This will be the same path followed by the cutting edge or point of the tool.

When following a particular template dimension $L_t$, as shown in Fig. 13, the eccentricity of the stylus and the stylus diameter $D_s$ will cause the path $x$ traced by the resolver axis to give us a resulting dimension, $L_x$ which may be defined as below:

$$L_x = L_t + \left[\frac{D_s}{2} - e \sin \gamma\right] \qquad (1)$$

where $\gamma$ is the angle between the tangent to the surface traced and the eccentric arm. The angle $\gamma$ is normally about 45°. Since the tool diameter $D_t$ is finite, the final dimension $L_f$ cut by the tool will be defined as below:

$$L_f = L_x - \frac{D_t}{2} = L_t + \left[\frac{D_s}{2} - .707\, e\right] - \frac{D_t}{2} \qquad (2)$$

$D_s$ is constant but $D_t$ varies as the tool wears or is reground. If "$e$" varies over the range of wear of $D_t$, the condition $L_f = L_t$ will obtain when $$\frac{D_s}{2} - .707_e - \frac{D_t}{2} = 0 \qquad (3)$$

To produce slightly over-size or slightly under-size parts, the constant 0.707 may be slightly decreased or slightly increased.

Means for adjusting the eccentricity of the stylus 10 relative to the resolver shaft 11 is shown in Fig. 16 and comprises an eccentric bushing 10a for the stylus, which bushing is angularly adjustable in an arm 10b and may be secured in adjusted position by a clamping screw 10c.

The eccentricity of this system is however quite small in actual practice; usually .020" to .040". Since the tool wear is usually no more than .005" to .010", the eccentricity can easily accommodate these variations.

Removal of excess material

For particular situations in which the cutting tool cannot remove all of the material in one pass, the system can be modified to permit removal of steps of material. Equation 3 above shows that $L_f$ is a function of $L_t$, $D_s$ and $D_t$. If $D_s$ is made larger than the normal size for exact duplication, it is apparent that $L_f$ will be greater than the original template dimension and an oversize duplicate of the template will result. The stylus diameter $D_s$ may easily be increased by substituting a stylus of increased dimension, $D_s+d$. This will increase the work size by $d/2$. The value of $d$ to be selected will depend on the amount of stock which can practically be removed at one cut by the cutting tool.

Constant cutting feed control loop

A special control loop (Fig. 14) permits direct control of cutting feed, that is, the advance in thousandths of an inch per revolution of the tool (or of the work, if the work rotates).

For a fixed r.p.m. of a tool, as N, the actual advance of the tool along the work is directly proportional to the vector velocity R of $V_x$ and $V_y$. For all cases, $R=V$, the excitation voltage of the resolver fixed phase.

Now feed may be defined as $R/N$ where R is in inches per minute and N is in revolutions per minute. Since $R=V$, feed may be rewritten as $V/N$ in inches per revolution. By controlling V, which changes the excitation of the resolver, the feed can be controlled.

V can be controlled manually, or it can be controlled automatically as shown in Fig. 14, by inserting an auto-transformer 50 between a constant voltage A.C. source 51 and the resolver excitation winding 52. The auto-transformer knob 54 may be directly calibrated in inches per revolution and may be manually controlled.

In cases where the spindle r.p.m. varies, an automatic control loop (Fig. 14) may be used to compensate for such spindle r.p.m. variations, so as to maintain a constant feed. By mounting a tachometer 60 on the tool spindle 62, there is available a voltage $V_t$ directly proportional to spindle r.p.m. N.

By comparing the voltages $V_t$ and V, their difference $V_e$ may be obtained. $V_e$ can then be used to excite a servo-motor 64 and thus shift the auto-transformer 50 until $V_e$ becomes zero.

By correctly calibrating this control loop, the auto-transformer voltage output V will vary as the spindle r.p.m. N. A constant feed in inches per revolution is thus provided.

$V_t=K_1N$ and $V=K_2V_t$ where $K_1+K_2$ are calibration constants. Then $$\text{Feed}=\frac{V}{N}=\frac{K_2V_t}{\frac{V_t}{K_1}}=K_1K_2=K_0$$

$K_0$ is a constant which is independent of spindle speed.

Conclusion

The general construction and operation is fully set forth and described in the preceding pages and with reference to the accompanying drawings.

In the construction controlled by mechanical template contact, a stylus is angularly shifted about its eccentric axis by such contact, and the angular displacement of the stylus effects changes in operation of one or the other or both of the two servo-motors which control the movements and positions of an associated tool.

Special provision is made to compensate for tool wear, and additional provision is made to vary the over-all size of the finished workpiece in pre-arranged proportion to the pattern.

With tape or record control, the servo-motors are responsive to coded signals emanating from a tape or record which carries a desired pattern of movements, duly controlled as to time and direction.

Having thus described my invention and the advantages thereof, I do not wish to be limited to the details herein disclosed, otherwise than as set forth in the claims, but what I claim is:

1. Contour-tracing apparatus having, in combination, a template, a supporting structure for a tool or workpiece, a pair of cooperating servo-motors effective to move said structure selectively along X and Y coordinates, a sensing device directly and yieldingly engaging the contour of said template, and operating control connections between said sensing device and said servo-motors, and said control connections including a small control motor and an associated resolver which together apply yielding pressure to hold said sensing device continuously against said template in all relative angular positions thereof and with a substantially constant bias torque.

2. Control tracing apparatus having, in combination, a template, a sensing device initially in a relatively remote position, automatic means to advance said sensing device to directly engage the template, and automatic means to thereafter shift the sensing device angularly by direct and mechanical template contact and in continuous engagement to indicate an exact contour to be reproduced.

3. In a contour-tracing apparatus having a template, a supporting structure for a tool or workpiece and a pair of cooperating servo-motors to move said structure selectively along X and Y coordinates, that improvement which comprises a sensing device initially held in inoperative position, means to move said inoperatively-positioned sensing device toward the template along a selected and predetermined line of approach to contact position, and means to thereafter automatically displace said sensing device by mechanical engagement only with the template to indicate an exact contour to be reproduced.

References Cited in the file of this patent

UNITED STATES PATENTS

| | | |
|---|---|---|
| 2,388,555 | Kuehni et al. | Nov. 6, 1945 |
| 2,622,616 | Humes | Dec. 23, 1952 |
| 2,627,055 | Calosi | Jan. 27, 1953 |
| 2,679,620 | Berry | May 25, 1954 |
| 2,723,598 | Mann | Nov. 15, 1955 |
| 2,786,396 | Wetzel | Mar. 26, 1957 |
| 2,813,461 | Schmid | Nov. 19, 1957 |
| 2,814,239 | Lavieri et al. | Nov. 26, 1957 |